US008051133B2

(12) United States Patent (10) Patent No.: US 8,051,133 B2
Schulz et al. (45) Date of Patent: Nov. 1, 2011

(54) E-MAIL FILING SYSTEM AND METHOD

(75) Inventors: Karsten A. Schulz, Middle Park (AU); Wasim Sadiq, Pullenvale (AU)

(73) Assignee: Sap AG, Walldorf (DE)

( * ) Notice: Subject to any disclaimer, the term of this patent is extended or adjusted under 35 U.S.C. 154(b) by 601 days.

(21) Appl. No.: 11/148,138

(22) Filed: Jun. 7, 2005

(65) Prior Publication Data

US 2006/0277195 A1 Dec. 7, 2006

(51) Int. Cl.
*G06F 15/16* (2006.01)
(52) U.S. Cl. .......................... 709/206; 709/207
(58) Field of Classification Search .................. 709/206, 709/207
See application file for complete search history.

(56) References Cited

U.S. PATENT DOCUMENTS

| | | | | |
|---|---|---|---|---|
| 5,899,995 | A * | 5/1999 | Millier et al. ................. | 707/102 |
| 6,148,294 | A * | 11/2000 | Beyda et al. ........................... | 1/1 |
| 6,216,122 | B1 * | 4/2001 | Elson ................................ | 707/3 |
| 6,226,630 | B1 * | 5/2001 | Billmers ........................... | 707/3 |
| 6,446,061 | B1 * | 9/2002 | Doerre et al. ................. | 707/738 |
| 6,694,336 | B1 * | 2/2004 | Multer et al. .......................... | 1/1 |
| 6,842,775 | B1 * | 1/2005 | Chastain et al. .............. | 709/207 |
| 6,847,989 | B1 * | 1/2005 | Chastain et al. .............. | 709/207 |
| 7,181,496 | B1 * | 2/2007 | Edwards et al. .............. | 709/206 |
| 2001/0042087 | A1 * | 11/2001 | Kephart et al. ................ | 707/530 |
| 2003/0187938 | A1 * | 10/2003 | Mousseau et al. ............. | 709/206 |
| 2004/0199595 | A1 * | 10/2004 | Banister et al. ................ | 709/207 |
| 2005/0198153 | A1 * | 9/2005 | Keohane et al. ............... | 709/206 |
| 2005/0198173 | A1 * | 9/2005 | Evans ........................... | 709/206 |
| 2006/0010217 | A1 * | 1/2006 | Sood .............................. | 709/206 |
| 2006/0155810 | A1 * | 7/2006 | Butcher ......................... | 709/206 |
| 2006/0168036 | A1 * | 7/2006 | Schulz et al. .................. | 709/206 |
| 2006/0168057 | A1 * | 7/2006 | Warren et al. ................. | 709/206 |
| 2006/0173842 | A1 * | 8/2006 | Horvitz et al. .................... | 707/6 |
| 2006/0240331 | A1 * | 10/2006 | O'Brien et al. .................... | 430/5 |

* cited by examiner

*Primary Examiner* — Karen Tang
(74) *Attorney, Agent, or Firm* — Schwegman, Lundberg & Woessner, P.A.

(57) ABSTRACT

An exemplary embodiment providing for one or more improvements includes an e-mail server including at least one client mailbox for the receipt of e-mail over a network, and at least one client apparatus of the client computer coupled to the e-mail server for access to the e-mail in the client mailbox, wherein at least one of the e-mail server and the client apparatus facilitates in the filing of e-mail by providing a number of suggestions to the client user as to where to file the e-mail. One exemplary method facilitates the filing of e-mail by monitoring the filing of e-mail by an e-mail recipient, creating a dynamic shortcut list based upon the monitoring, and displaying the shortcut list to facilitate the filing of e-mail by an e-mail recipient. Another exemplary method to facilitate e-mail filing includes detecting a request for a recommendation as to where to file an e-mail by an e-mail recipient, analyzing the e-mail, comparing the e-mail to a database of e-mail filing information, and displaying a shortcut list to facilitate the filing of the e-mail by the e-mail recipient.

15 Claims, 16 Drawing Sheets

| SENDER ADDRESS | FOLDER | # E-MAILS |
|---|---|---|
| Able, Joe | Able, Joe | 20 |
| Able, Joe | Lunch | 4 |
|  |  |  |
| SMITH, LISA | Smith, Lisa | 30 |
| SMITH, LISA | Lunch | 6 |

E-MAIL FILING SYSTEM AND METHOD

BACKGROUND

E-mail is one of the most frequently used forms of communication in present day society. While e-mail has been used in private network environments for decades, the popularity of e-mail has skyrocketed over the past decade with the widespread use of the Internet. In fact, it can be said that the use of e-mail has become ubiquitous in many environments. That is, it is heavily used and relied upon in business, personal, and governmental environments for convenient, inexpensive, and rapid communications.

With the explosion in the use of the Internet, the problem of handling large numbers of e-mails has increased. That is, the filing of large numbers of e-mails by an e-mail recipient can be a very time-consuming and error-prone activity.

One approach to addressing this problem is to allow users to file e-mails in folders. As used herein, a "folder" is a storage location, typically identified by an icon, name, or other identifier, which can store a number of related e-mails. Folders are also typically allowed to enclose subfolders. This approach can be found, for example, in the Microsoft Outlook® e-mail system.

Studies have not determined any single comprehensive folder filing strategy for e-mails. Some e-mail recipients prefer to file their e-mail according to the sender's name. This has the advantage of an easy assignment of e-mails to a target folder, e.g., by a simple assignment rule. However, it breaks the relationship of e-mails that belong to a common discussion thread or topic. Other e-mail recipients prefer to file e-mails on the basis of the topic they relate to, such as finances, projects, etc. However, there are often e-mails that do not relate to a topic, or relate to a rarely-used topic. Some other people prefer to file their e-mail according to a mixed approach of the e-mail sender and the topics to which the e-mails pertain. This can work fairly well when the e-mail recipients file their own e-mail, but the system can break down if the e-mail recipient allows another, such as an assistant, to file their e-mails. Furthermore, even after the target folder is determined, it can take a considerable period of time to navigate to the target folder by possibly traversing through a hierarchy of folders and subfolders and, then, moving the e-mail to that final destination.

There have been some attempts to automate the filing of e-mails in their proper folder. In one approach, a set of fixed rules is used to automatically sort incoming e-mail into an appropriate folder. This method has the disadvantage, however, of bypassing the e-mail recipient's Inbox, and, therefore, the e-mail recipient may never see the e-mail.

Another approach is to allow the e-mail recipient a shortcut to the last used folder. This is implemented in both Apple Macintosh and Microsoft Outlook® e-mail systems. That is, the Macintosh and Microsoft Outlook® e-mail systems permit an e-mail recipient to quickly move a current e-mail into last used folder. While this can be a handy feature if filing a number of e-mails into the same folder is desired, it is of limited general applicability.

Yet another approach eliminates the filing of e-mail entirely. For example, Gmail, the e-mail system provided by Google®, does not use a folder system to file e-mails but, rather, uses a Google search to find the message that a recipient wants. Furthermore, Gmail keeps each message grouped with all of its replies and displayed as a conversation to facilitate the location of a related string of e-mails.

While search systems such as those used by Gmail may reduce the need for the filing of e-mails, they suffer from limitations including the fact that an e-mail may not be found if the correct keyword is not searched. For this and other reasons, most users would prefer to have the ability to file their e-mail in folders, even if they also had powerful search algorithms for searching through the e-mail database by keywords.

SUMMARY

An embodiment, by way of a non-limiting example, includes an e-mail filing system having an e-mail server including at least one client mailbox. The system optionally includes at least one e-mail apparatus of the client user that is coupled to the e-mail server for access to the e-mail in the client mailbox. At least one of the e-mail server and the client apparatus may facilitate in filing the e-mail by providing a number of suggestions to the client user as to where to file the e-mail. Most frequently, this facilitation happens on the client apparatus, although it can also be provided by the e-mail server, or distributed between the e-mail server, the client apparatus, or other devices coupled to the network.

In an exemplary embodiment, the e-mail server and the client apparatus are implemented on the same computer system. For example, this can be a personal computer system. In another exemplary embodiment, the e-mail filing system is implemented on two or more computer systems.

In an exemplary embodiment, a number of suggestions are ranked by an order of preference. These ranked suggestions are created by observing past filing behavior of the client user, at least in part. In another exemplary embodiment, the plurality of suggestions can be provided, at least in part, by analyzing at least one of metadata and content of the e-mails. In a still further exemplary embodiment, the analysis can optionally include the analysis of e-mail addresses.

In an exemplary embodiment, a method to facilitate e-mail filing includes the monitoring of the filing of e-mails by an e-mail recipient. Optionally, this monitoring can create a dynamic shortcut list based upon the monitoring, and display the shortcut list to facilitate the filing of e-mail by an e-mail recipient. In an embodiment, the monitoring of the filing of the e-mail includes noting the filing of a filed e-mail in a folder, and storing data concerning the filed e-mail in the folder. In another embodiment, the data concerning the filed e-mail can be filed in a database. In another exemplary embodiment, the data concerning the filed e-mail in the folder includes the address of the sender of the filed e-mail and the identity of the folder. In another exemplary embodiment, the data concerning the filed e-mail can further include the number of e-mails filed in the folder.

In an embodiment offered for the purpose of example and not limitation a method to facilitate e-mail filing includes detecting a request for a recommendation as to where to file an e-mail by an e-mail recipient. The method optionally includes analyzing the e-mail, comparing the e-mail to a database of e-mail filing information, and displaying a shortcut list to facilitate the filing of e-mail by an e-mail recipient. An embodiment, by way of example, creates a database, at least in part, by noting the filing of a filed e-mail in a folder and storing data concerning the filed e-mail and the folder in the database. In an exemplary embodiment, the data concerning the filed e-mail and the folder includes the address of the sender of the filed e-mail and the identity of the folder. In another exemplary embodiment, the data can optionally include the number of e-mails filed in the folder.

An advantage of at least aspects of certain exemplary embodiments is that the filing of e-mails in folders is facilitated. For example, in certain embodiments, the filing of e-mail is facilitated by providing a shortcut list, which can optionally be dynamically updated, for the e-mail recipient to file his or her e-mail. As another example, a short list of recommended folders can be presented to a user based upon analyzed content of the e-mail to be filed.

In addition to the exemplary aspects, embodiments and advantages described above, further aspects, embodiments and advantages will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

Figure 1:
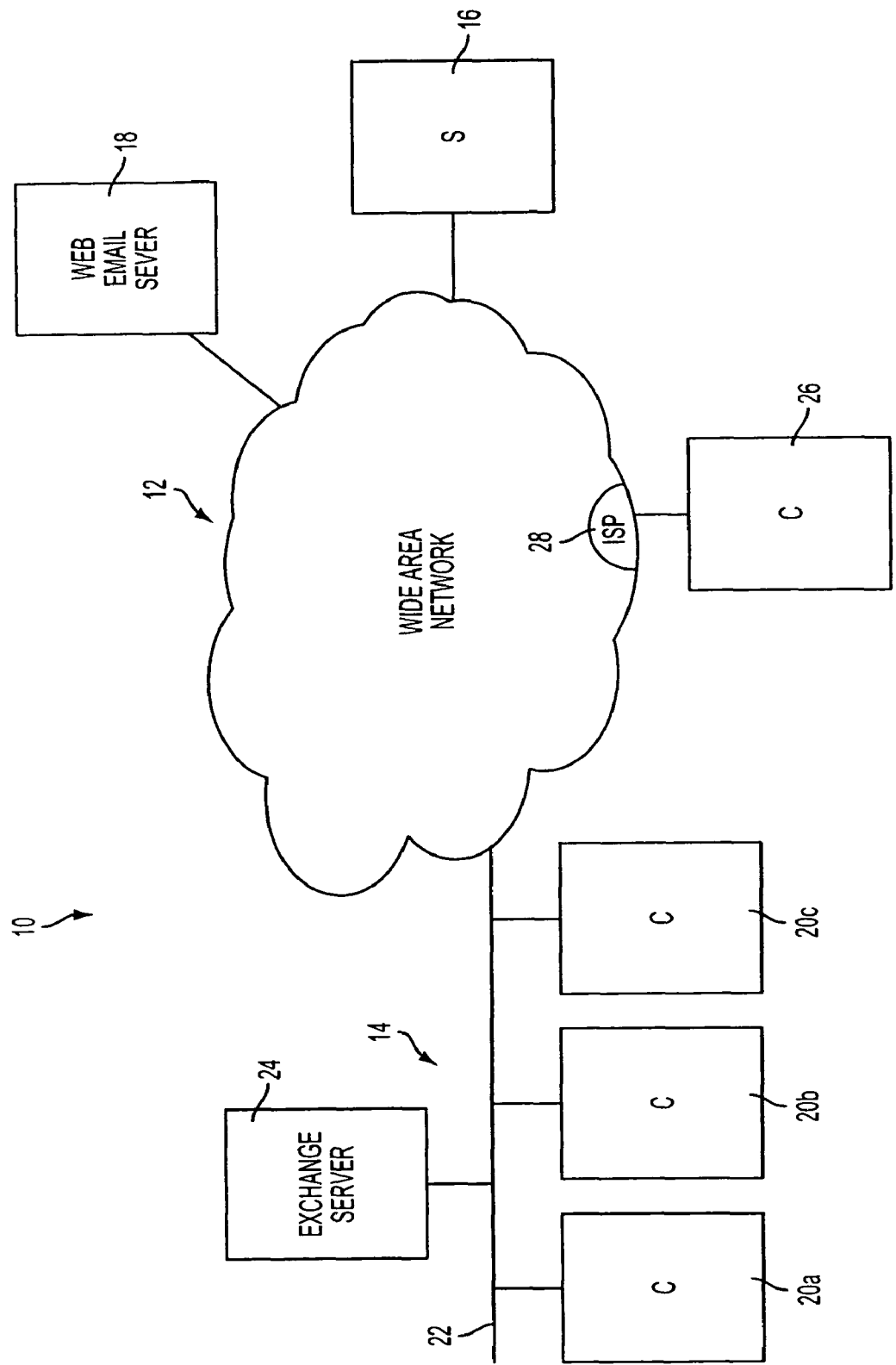
FIG. 1 is an exemplary e-mail system employing, for example, a wide area network and a local area network.

In FIG. 1, a network communication system 10 includes, for example, a wide area network 12, a local area network 14, a general server 16, and a web e-mail server 18. The wide area network can be, for example, the Internet. Alternatively, other forms of wide area network can be used, or the wide area network can be optional. Furthermore, the wide area network 12 can be a network of networks, as will be appreciated by those skilled in the art.

Local area network 14 can, for example, include a number of client computers 20A, 20B and 20C that are coupled to a networking medium 22. The client computers 20, for example, can be personal computers or workstations, while the networking medium 22 can include wireless networking, wired networking, optical fiber networking, etc., as will be appreciated by those skilled in the art. Typically, the local area network 14 includes one or more servers coupled to the networking medium 22. For example, an exchange server 24 is shown to be coupled to the networking medium 22 for communication therewith.

The server 16, shown by way of example, may be a web server operating under the, for example, Linux® or Windows® operating systems. There are typically many servers of the type of server 16 performing a number of specialized functions that can be accessed by other devices in the network communications system 10 and which, in turn, may be able to be accessed by server 16.

The web e-mail server 18 can be one of a number of types of Internet e-mail web servers. The web e-mail server 18 typically provides e-mail capability for clients, such as clients 20A-20C, or individual client 26 coupled to the wide area network 12 through an Internet Service Provider (ISP) 28. By using the Internet functionality and the services of the web e-mail server 18, e-mails can be sent among the various client computers.

E-mail that originates on the wide area network 12 may be processed, for example, by a server connected to a local area network, such as exchange server 24 making it part of local area network 14. An example of an exchange server is the Outlook® exchange server provided by Microsoft Corporation of Redmond, Wash. The exchange server can facilitate the exchange of e-mail between local area network clients, such as clients 20A-20C, and can also facilitate the exchange of e-mail with other devices on the network communications system 10, such as web e-mail server 18, client 26, or another device such as a server 16.

Figure 2:
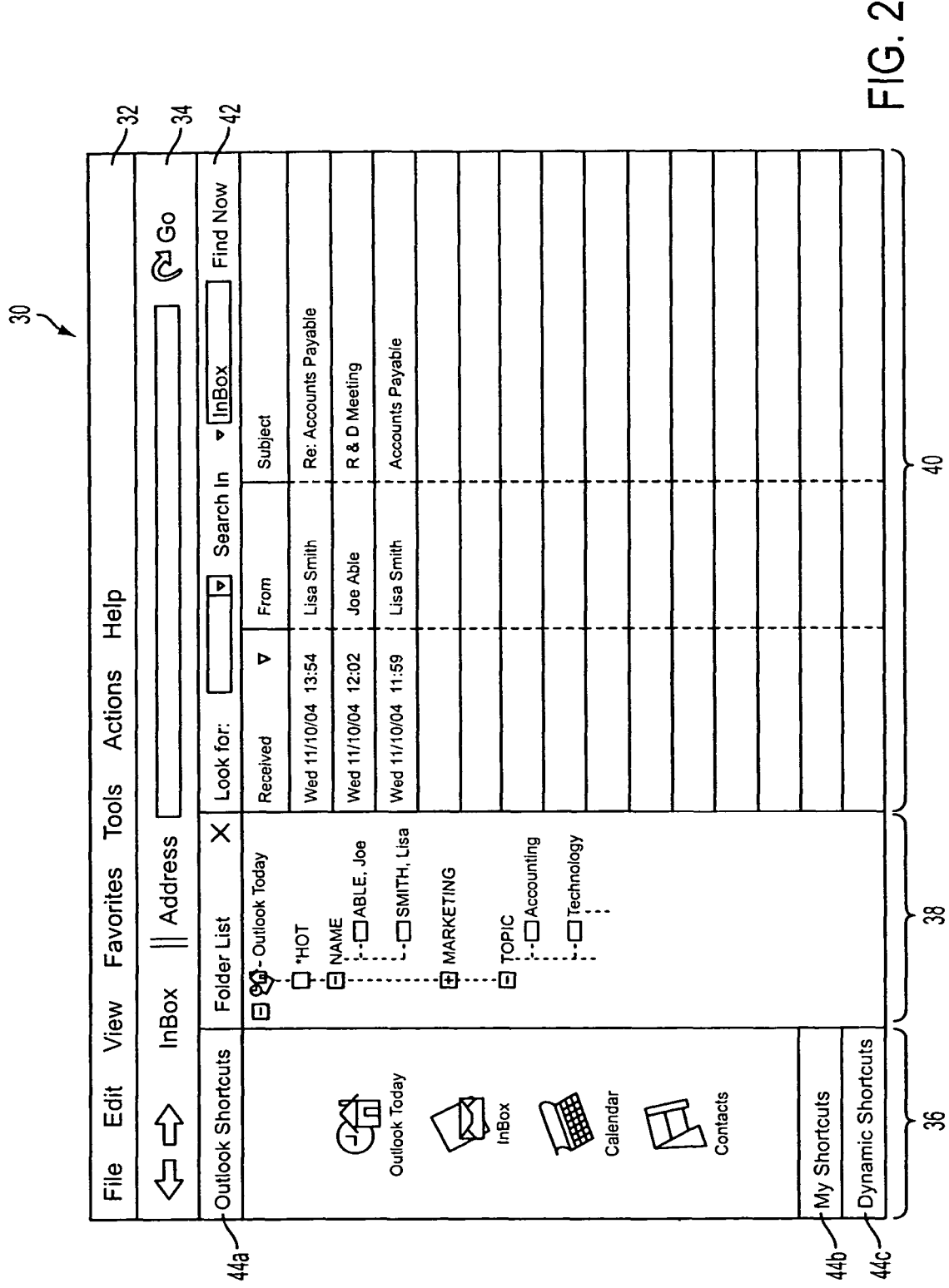
FIG. 2 is an illustration of an embodiment of an e-mail system, such as that is provided by Microsoft with its Outlook® e-mail system, enhanced with dynamic shortcut list functionality.

In FIG. 2, a screen shot 30 of a user interface of an e-mail system is illustrated. This screen shot 30 is based on the Microsoft Outlook® user interface. The interface 30 includes a menu bar 32, a navigation bar 34, a "shortcut" section 36, a folder list 38, and an e-mail list 40. The e-mail list 40 section includes a search bar 42.

The menu bar 32 and navigation bar 34 are of typical of Microsoft Windows-based application programs. The shortcut 36 includes a number of tabs 44A, 44B, and 44C, which permit the viewing of icons or other identifiers for various shortcuts. As used herein, the term "shortcut" specifies any icon, word, address, or other identifier which provides navigation to a desired location. The ultimate destination can be any number of places, including folders, application programs, web links, etc., as will be appreciated by those skilled in the art. In the example of FIG. 2, the Outlook® shortcut tab 44A is activated to display the icons and titles for Outlook® Today, Inbox, Calendar, and Contacts. By activating tab 44B, or 44C, other icons or indicators of shortcuts will be displayed.

The folder list 38 in the Outlook® interface includes a collapsible hierarchy of folders and subfolders. In this example, the highest level or root folder is "Outlook Today" and a number of subfolders are provided including the subfolders "*Hot", "Name", "Marketing", and "Topic". The folder "Name" has been opened (as indicated by the "−" sign), to display two subfolders, namely "Able, Joe" and "Smith, Lisa". The subfolder "Marketing" itself has subfolders, but is not illustrated in an open form in this figure. However, Outlook® signals that Marketing includes subfolders with the "+" next to the folder name. Finally, the subfolder "Topic" is opened to display subfolders "Accounting" and "Technology".

The e-mail list 40 is illustrated with three columns and a number of rows. The illustrated columns include "Received", "From", and "Subject." The e-mail list displays, in this example, three received e-mails in the user's "Inbox", namely two e-mails from Lisa Smith and one e-mail from Joe Able.

Traditionally, to file the various e-mails from the e-mail list 40, a user would either right-click on the e-mail and saving it directly into a folder or drag the e-mail to an appropriate folder on the folder list or, possibly, on the Outlook® shortcut list. For example, the e-mails from Lisa Smith can be dragged into the folder Lisa Smith in the folder list. While this technique works fairly well for a small number of e-mails and a small number of folders, there are many situations where an e-mail recipient has many hundreds or even thousands of e-mails to file into dozens or even hundreds of different folders.

Figure 3:
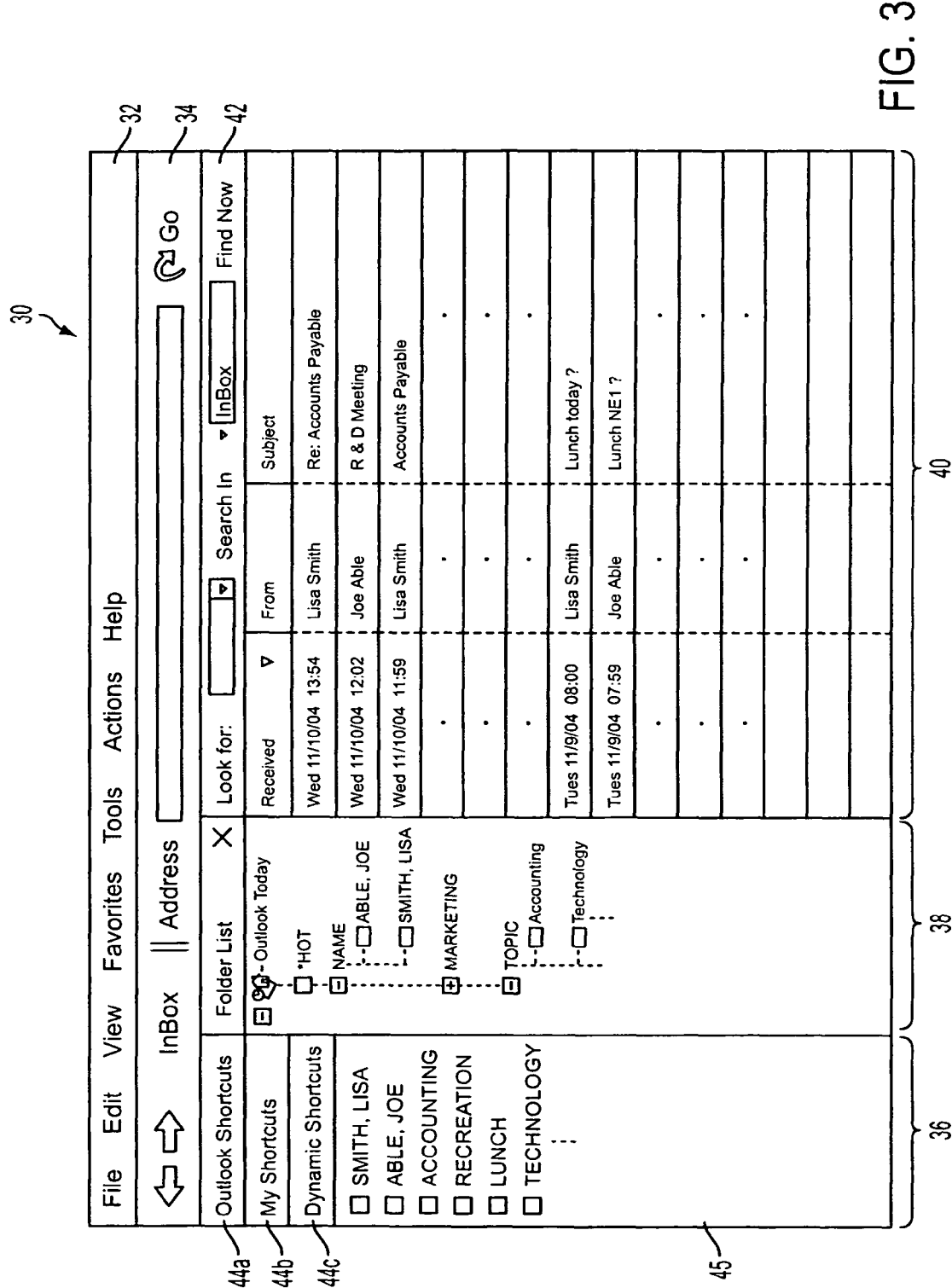
FIG. 3 is a further illustration of an improved e-mail system including a dynamic shortcut list.

In FIG. 3, the dynamic shortcuts tab 44C has been selected to display a shortcut list 45 including a number of shortcuts including "Smith, Lisa", "Able, Joe", "Accounting", "Recreation", "Lunch", and "Technology". By "activated" it is meant herein that the user of the e-mail system indicates that he or she would like to have the dynamic shortcut lists displayed. This can be accomplished, for example, by "clicking" on the tab 44C with a pointer controlled by, for example, a pointer mechanism Pointer mechanisms include, but are not limited to, the familiar computer mouse, trackballs, etc. Alternatively, shortcut list can be opened in other fashions, such as by a keyboard command, as will be appreciated by those skilled in the art.

In addition to the three messages illustrated in FIG. 2, two additional e-mails are illustrated in FIG. 3 including an e-mail from Lisa Smith with the subject "Lunch today?" and an e-mail from Joe Able with the question "Lunch NE1?" As noted, there are dynamic shortcuts to the folders Smith, Lisa, Able, Joe, and Lunch on the dynamic shortcut list 45. This allows an e-mail to be dragged directly from the e-mail list 40 into a dynamic shortcut in a very efficient manner.

In certain embodiments, the dynamic shortcuts on the dynamic shortcut list 45 are updated automatically. For example, the filing behavior of a user can be monitored to determine which folders are being most frequently used for filing. In example of FIG. 3, there is a high frequency of e-mails from both Lisa Smith and Joe Able, and there is a high frequency of e-mails concerning lunch. As a result, the dynamic shortcuts list 45 under the dynamic shortcut tab 44C can be updated with shortcuts to the folders that have been most frequently used within a given timeframe.

The dynamic shortcuts can be updated automatically or, by user preference, can, for example, be updated manually. In updating automatically, in one embodiment the frequency of use within a particular period may determine the hierarchical order of the dynamic shortcut. For example, in FIG. 3, Lisa Smith has a higher ranked dynamic shortcut than Joe Able because she sends e-mail to the e-mail recipient more frequently. This dynamic shortcut list can be constantly rearranged based upon the actual filing patterns of the e-mail recipient, by way on one non-limiting example.

In an alternate embodiment, by way of additional non-limiting example, the dynamic shortcuts list is not automatically updated or rearranged. This is because some users may find it disquieting to have the dynamic shortcuts list reordered automatically. For example, user may be used to seeing "Smith, Lisa" at the top of his dynamic shortcuts list and would be disoriented if her shortcut dropped down to the second or third position due to an automatic readjustment. This user preference can be accommodated by allowing manual reordering of the dynamic shortcuts list by, for example, dragging a shortcut to a new position in the shortcut list 45. Alternatively, certain shortcuts on the list can be replaced by new shortcuts, or shortcuts can be added or removed without otherwise affecting the shortcuts on the list.

Figure 4:
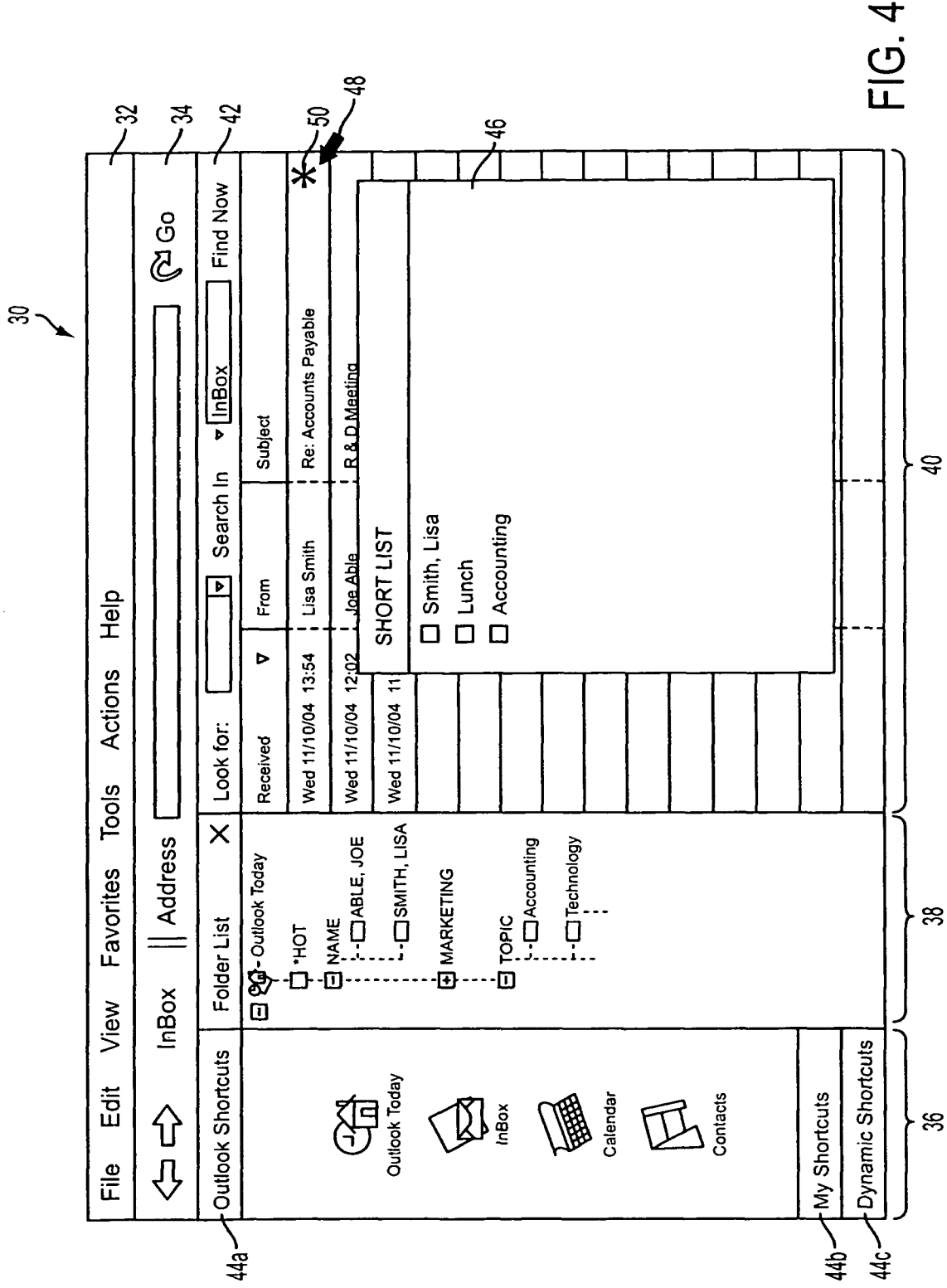
FIG. 4 is an illustration of an improved e-mail system including a short list of folders in which to file an identified e-mail.

In FIG. 4, user interface 30 displays a new window 46 known as the "short list" window. In this example, the window 46 is shown as a "pop-up" window. The short list window 46 can be activated, for example, by clicking on or otherwise selecting an e-mail from the e-mail list 40. In this example, a cursor 48 is aligned with the message of Lisa Smith from Wednesday, Nov. 10, 2004, at 13:54 and is selected or activated with a click 50. As will be appreciated by those skilled in the art, this click could be a left-click, right-click or other type of indication on a mouse, trackball, or equivalent that this e-mail is to be selected.

The short list 46 includes at least one suggestion as to a proper destination folder for the e-mail that has been selected. That is, the short list can include one or more possible suggestions. In the case of a null set short list, a simple algorithm such as using the last folder can be implemented in an exemplary embodiment. Alternatively, if no reasonable suggestions can be made, the short list may be a null set as well. Therefore, the short list in various embodiments can include a null set, a single entry, or multiple entries.

In the example of FIG. 4, the short list includes the suggested filing folders of "Smith, Lisa", "Lunch", and "Accounting". Preferably, this short list is derived by an analysis of the selected e-mail. For example, the e-mail of this example is from Lisa Smith and, therefore, that is a likely destination folder. Also, Lisa Smith has, in the past, frequently sent e-mails on the subject of lunch and accounting, so those are also added to the short list as possible destinations for the e-mail. In an exemplary but non-limiting example, the short list is arranged in a hierarchical fashion with the highest probability suggestion at the top, and the lowest probability suggestion at the bottom. In other embodiments, the short list may be arranged in other ways.

Figures 5A, 5B:
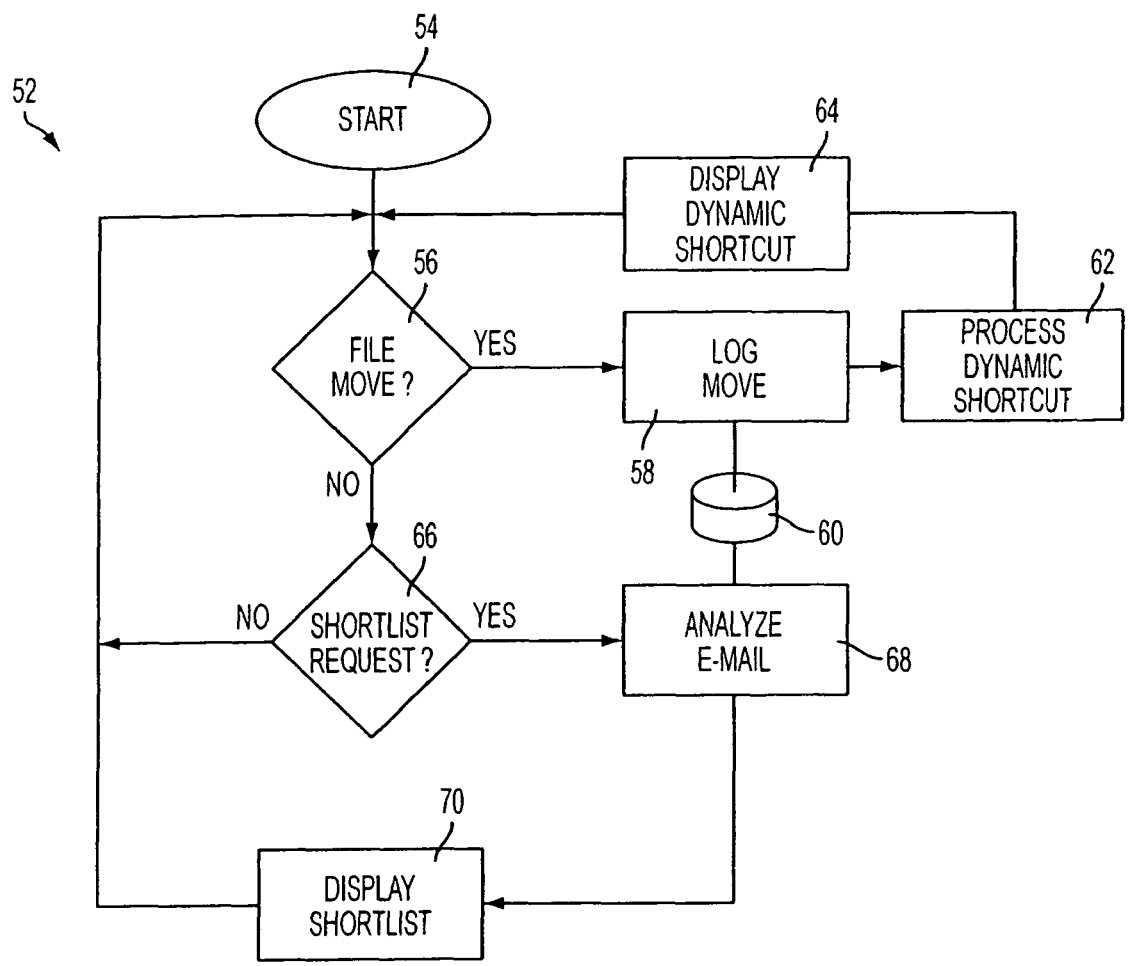
FIG. 5A is a flow diagram illustrating an exemplary embodiment for the assistance of the filing of e-mail.
FIG. 5B is an illustration of an exemplary database that may optionally be used in the process of FIG. 5A.

FIG. 5A is a flow diagram, presented by way of example and not limitation, which can generate the dynamic shortcut list and the short list described previously with respect to FIGS. 3 and 4. The process 52 of FIG. 5A begins at 54 and, in a decision operation 56, it is determined whether a file has been moved. That is, in an embodiment, the movement of an e-mail into a folder by an e-mail recipient (i.e., the user) is monitored by the system. If a file move is detected, an operation 58 may log this move into, by means of example but not limitation, database 60. As used herein, the term "database" is used in its most expansive form to include many methodologies for the storage and retrieval of data.

Next, in an exemplary operation 62, the dynamic shortcut list is processed. An operation 64 displays the dynamic shortcut list, such as the dynamic shortcut list 45 of FIG. 3. Operational control then returns to an operation 56. In the absence of the detection of a file move by the e-mail recipient, an operation 66 determines whether there is a shortlist request. In the example that was given with respect to FIG. 4, this shortlist request was provided by aligning a cursor 48 with the desired e-mail and activating or clicking the cursor to select the shortlist request. As will be seen in other illustrative embodiments, there are other ways of requesting the shortlist, as will be clear to those of skill in the art.

If a shortlist request is not detected, operational control returns to operation 56. However, if a shortlist request is detected, an operation 68 analyzes the selected e-mail and, in response thereto, displays the shortlist in an operation 70. An example of the shortlist associated with the selected e-mail of FIG. 4 is shown at window 46. Operational control then returns to operation 56.

It should be noted that the operation 58 of logging a detected move and the operation 68 which analyzes e-mail may utilize, for illustrative purposes, the common database 60. In other embodiments, this may not be the case.

FIG. 5A, by way of non-limiting example, illustrates an embodiment for the database 60. In the illustration, the database 60 is represented as a tabular database having three columns and a number of rows. In this example, the columns correspond to the sender's address, the folder to which the e-mail has been moved and the number of e-mails that are in that folder, respectively. As will be discussed in greater detail subsequently, the information in this database can be used to provide recommendations for both the dynamic shortcuts and for the shortlist.

In the example of FIG. 5B, e-mails having the sender address "Able, Joe", have been filed in the folder "Able, Joe" 20 times. E-mails from "Able, Joe" have also been filed in the folder "Lunch" four times. E-mails from "Smith, Lisa" have been filed in the folder "Smith, Lisa" 30 times, and e-mails from "Smith, Lisa" have been filed in the folder "Lunch" six times.

The sender address is a particularly valuable datum for the recommendation of filing folders with respect to certain embodiments. This is because the e-mail recipient or user makes many mental associations based on the sender and will use implicit knowledge to the desired destination for the filed e-mail. There is, therefore, a higher correlation between the sender address and the final destination than other information, such as title, content, etc.

Figure 6:
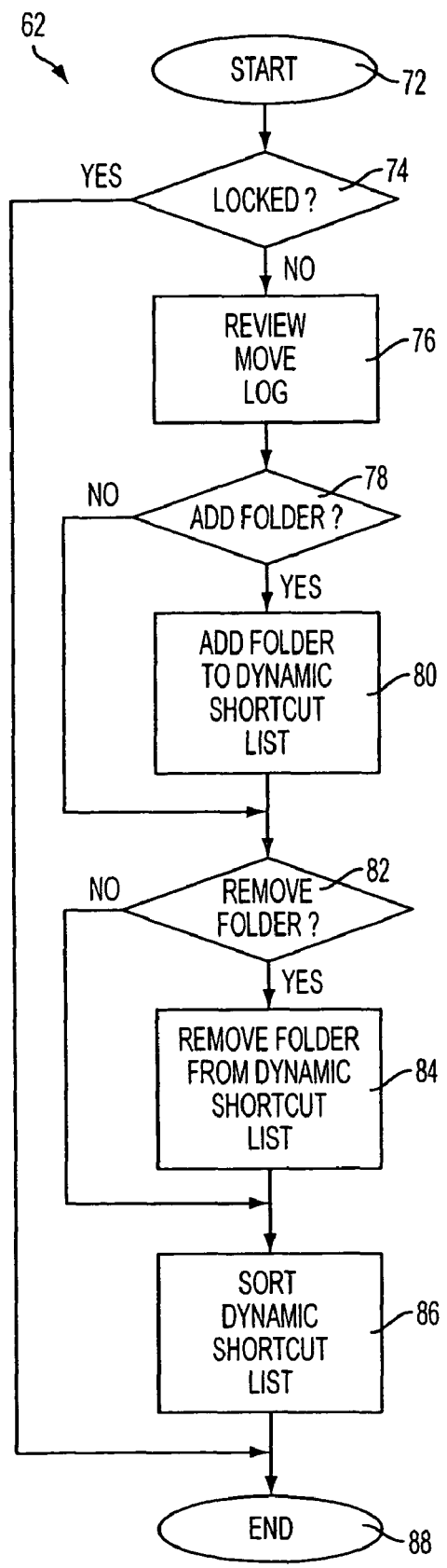
FIG. 6 is a flow diagram illustrating in greater detail the "process dynamic shortcut" operation, by way of example, of FIG. 5A.

FIG. 6 is a flow diagram of the process 62 of FIG. 5A, by way of non-limiting example. In the operation Process Dynamic Shortcut 62, the operation begins at 72 and, in an operation 74, it is determined whether the dynamic shortcut list is locked. For example, with reference to FIG. 3, the dynamic shortcut list 45 may be locked by user preference to prevent the reordering of the dynamic shortcut list. If it is locked, the process 62 ends at 88. However, if the dynamic shortcut list is not locked, an operation 76 reviews the moved log 60.

An exemplary "Moved Log" is illustrated in FIGS. 5A and 5B. As a result of operation 76, it is determined at 78 whether a new folder should be added. A new folder may be added, for example, if it is observed that there is a high frequency of filing into a folder which was not previously on the dynamic short list. If it is determined that the folder should be added, the folder is added to the dynamic short list in operation 80. If the dynamic short list is ranked in a hierarchical fashion, this new folder could be added at the bottom of the list, replacing the dynamic shortcut that was previously at that position. Alternatively, the folder can be added to the dynamic shortcut list without removing the previously dynamic shortcut, or it could be added in positions other than at the end of the list. Further alternatively, the folder can replace a dynamic shortcut which is not at the end of the list.

Next, in an operation 82, it is determined whether a folder should be removed. A folder may be removed from the dynamic list, by way of non-limiting example, when its frequency of use falls below a predetermined threshold or below that of a new folder. A folder can be removed from the list for other reasons as well, as will be appreciated by those having skill in the art. If it is determined that a folder should be removed, the folder is removed from the dynamic shortcut list 45 in operation 84. Preferably, an optional step 86 re-sorts the dynamic shortcut list in an operation 86 before the end operation 88 of the process 62.

Figure 7:
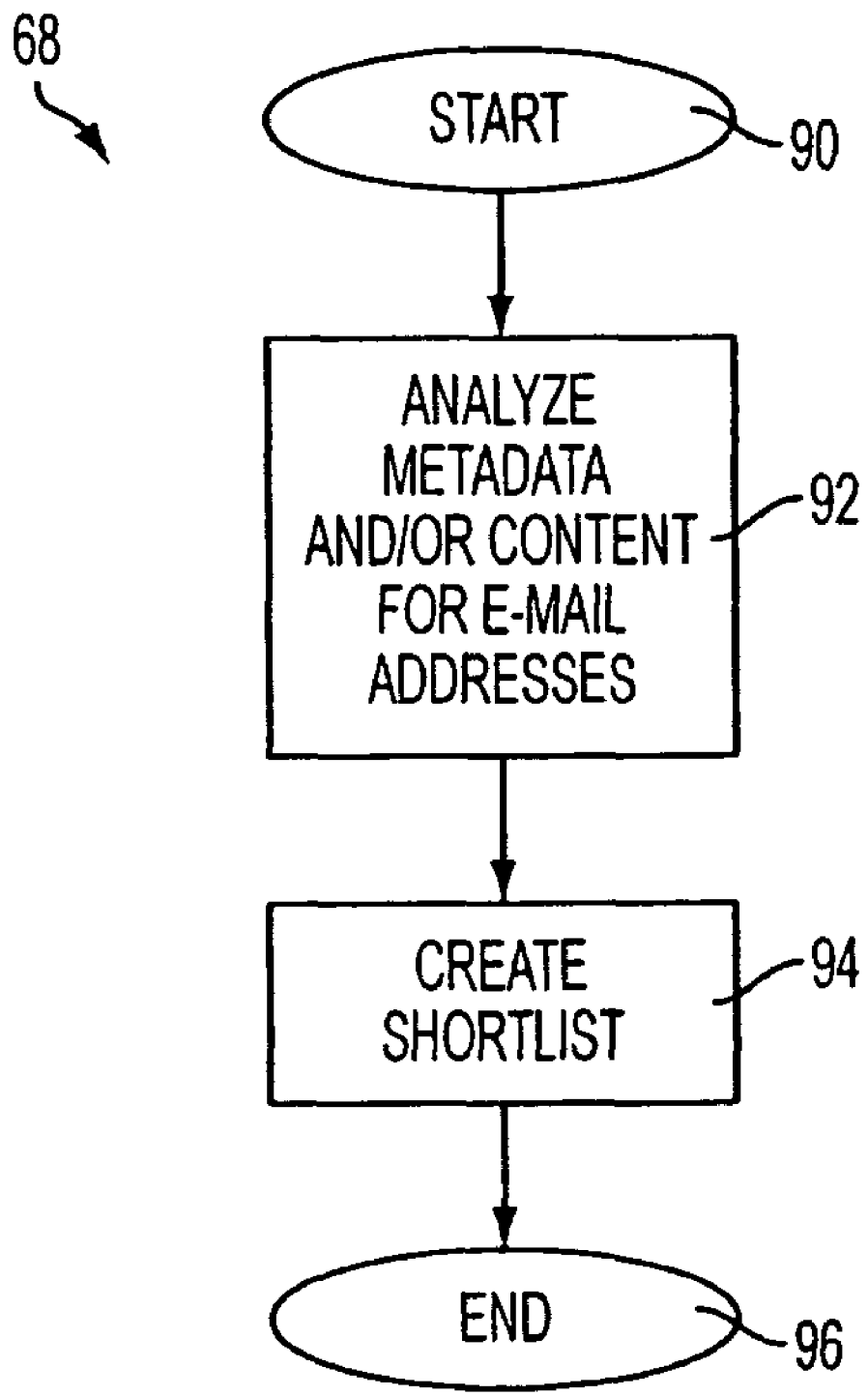
FIG. 7 is a flow diagram illustrating the operation "analyze e-mail", by way of example, of FIG. 5A.

In FIG. 7, the operation Analyze E-mail 68 of FIG. 5A is illustrated in greater detail, by way of non-limiting example. The process 68 begins at 90 and, in an operation 92, the metadata and/or content for e-mail addresses are analyzed. As used herein, "metadata" includes data not found as part of the content within the body of the e-mail, for example, the "from", "to", "cc", "re", etc., data which is associated with the body of the e-mail text. As used herein, "content" refers to information typically found within the body of the e-mail, e.g., text, graphics, embedded programs, etc. The content can also include, for example, attachments to the e-mail.

In accordance with one embodiment, the metadata and/or content of the e-mail are analyzed for e-mail addresses. As mentioned previously, there is a high correlation between e-mail addresses and the proper destination folder for the e-mail. This is particularly true for the e-mail address of the sender, but also true for e-mail addresses found elsewhere in the metadata or in the content of the e-mail. In certain embodiments, the metadata and/or content is analyzed for other factors. For example, in exemplary and non-limiting examples, the subject (or "re") metadata can be used to analyze the e-mail to recommend a folder in it can be filed, or a keyword search can be used on the e-mail content and/or metadata.

Based upon the analysis of the metadata and/or content of the e-mail an operation 94 creates a short list. This short list is shown by way of non-limiting example as short list 46 in FIG. 4. The process 68 then ends at operation 96.

FIGS. 8-13 illustrate an embodiment which provides a plug-in for Microsoft Outlook@. As is well known to those skilled in the art, a "plug-in" is software code which can be instantiated into a program (such as Microsoft Outlook®) to enhance the functionality of the program. Plug-ins, therefore, permit end users to enhance or modify the operation of a standard program.

In an embodiment, discussed by way of example and not limitation, an e-mail filing assistant or "EFA" is provided as a plug-in for Microsoft Outlook®. An exemplary functionality of the EFA plug-in is to keep track of where e-mails are filed, and to suggest to a user where to file e-mails. However, in an exemplary embodiment, the EFA plug-in functionality does not file the e-mails, but leaves it to the user to actually file them. This is because the electronic filing assistant cannot be 100% accurate, nor is a user 100% consistent in where they want to file their e-mails.

The EFA plug-in essentially "learns" and adapts to changing filing behaviors by the e-mail recipient. In one embodiment, the EFA plug-in can be a compiled Visual Basic program. Visual Basic is available from the Microsoft Corporation of Redmond, Wash. In another embodiment, the EFA can be a .Net application. As well known to those skilled in the art, a .Net application is implemented with the Microsoft.Net programming environment, language, and architecture. Alternatively, the functionality of the EFA plug-in can be directly integrated into a e-mail program, such as Microsoft Outlook®, or can be a stand-alone program. As well known to those skilled in the art, the EFA plug-in functionality can also be provided in a number of alternative fashions, such as distributed over the network, on a remote server, etc.

Figure 8:
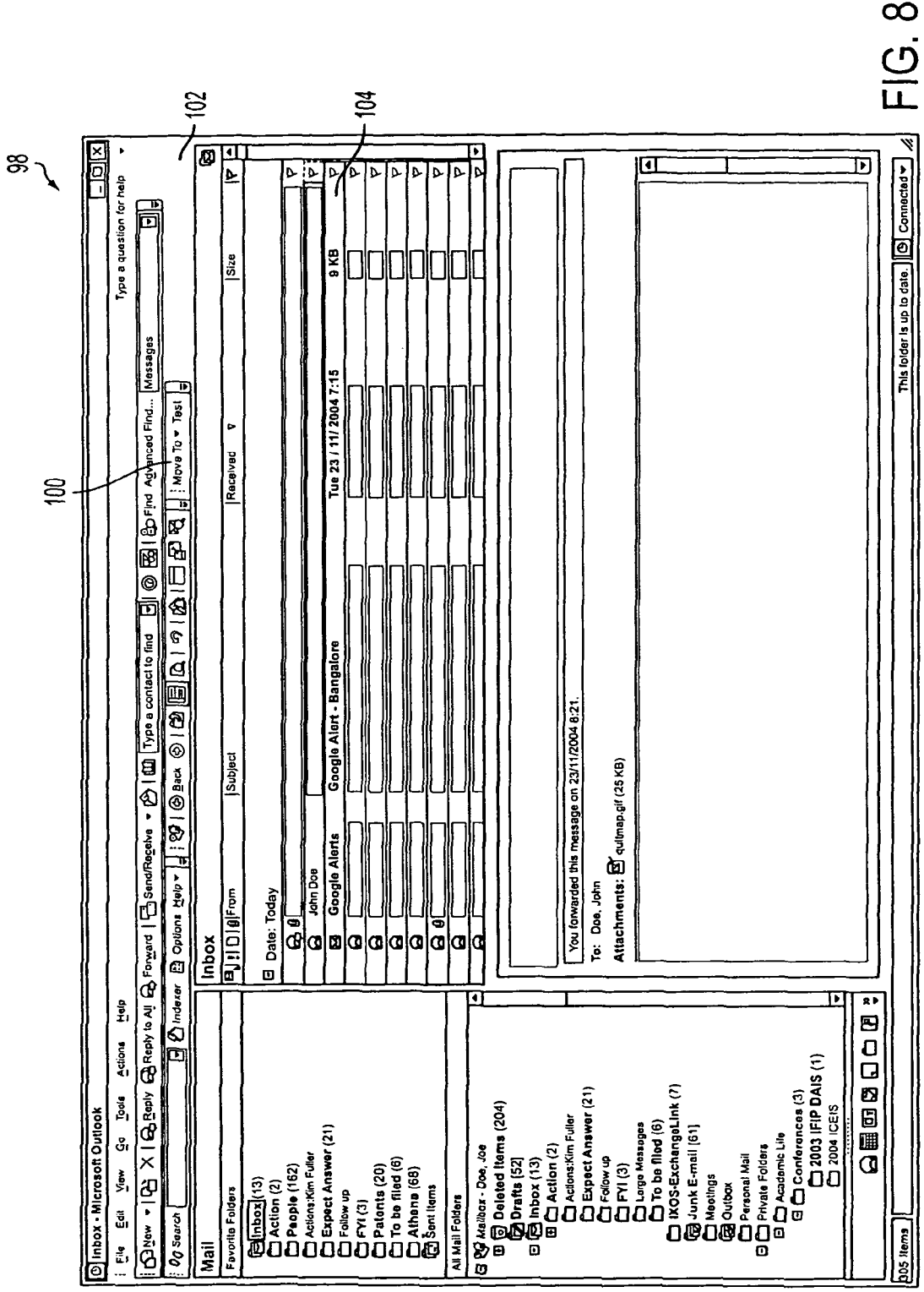
FIG. 8 is an exemplary screen shot of an improved e-mail system showing an exemplary e-mail.

In FIG. 8, a screen shot 98 of a Microsoft Outlook® Inbox provided with an EFA plug-in is shown. The most visible addition made by the EFA plug-in is a "Move To" button 100 added to a search tool bar 102. An e-mail 104 has been selected and, for the purpose of example, it is assumed that the user wishes to file the e-mail 104.

Figure 9:
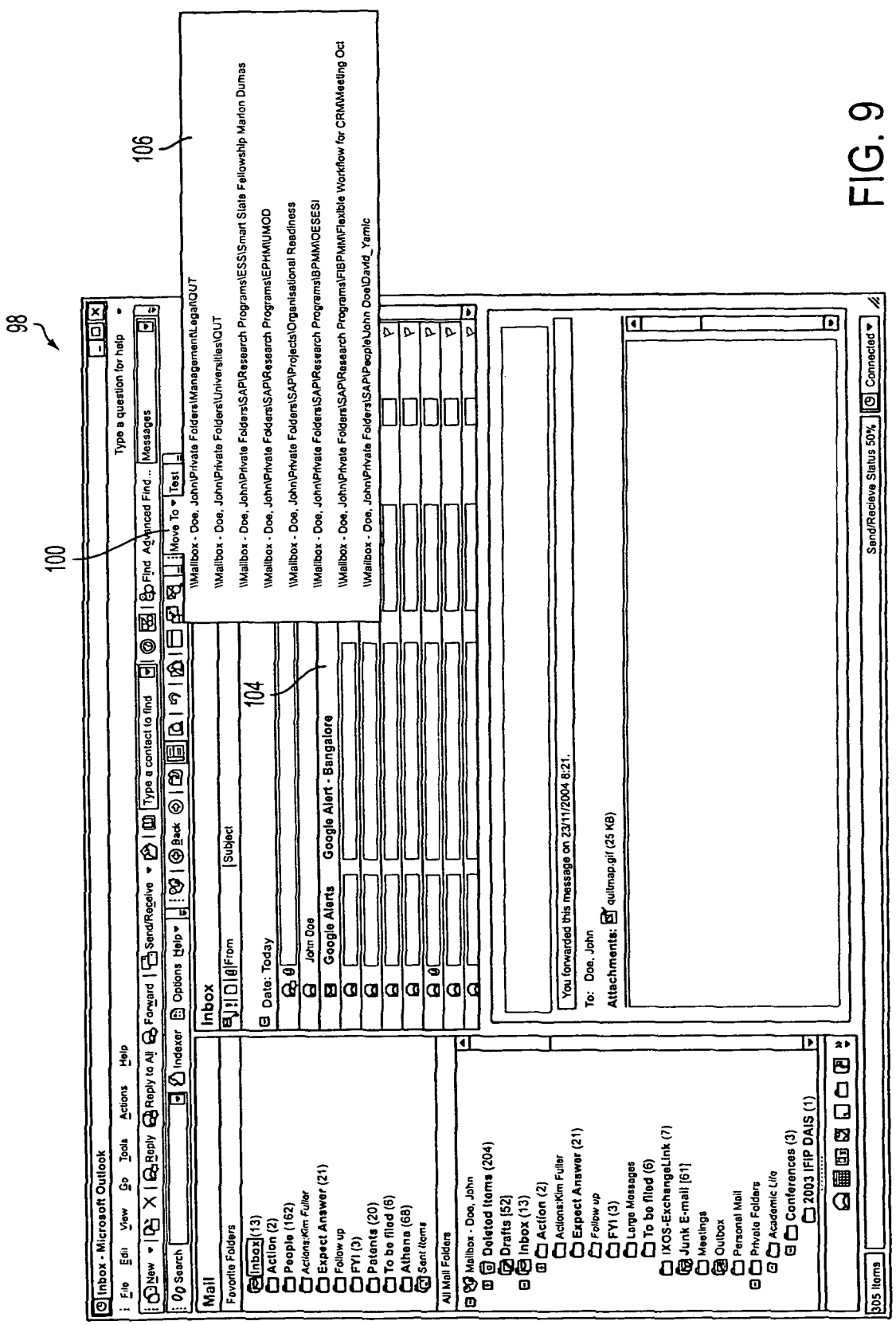
FIG. 9 is a screen shot, similar to that of FIG. 8, with the addition of a short list of suggestions as to where to file the e-mail.

In FIG. 9, the user can obtain advice as to where to file the e-mail by clicking on or actuating the "Move To" button 100. The functionality of the Move To button 100 is provided herein by way of example only, and it will be clear to those skilled in the art that there are numerous other fashions for implementing the functionality of the EFA plug-in. With the selection of the Move To button 100, a drop down menu 106 is provided by the EFA plug-in. In this example, there are eight different folders suggested, as alternatives, by the EFA plug-in software.

Figure 10:
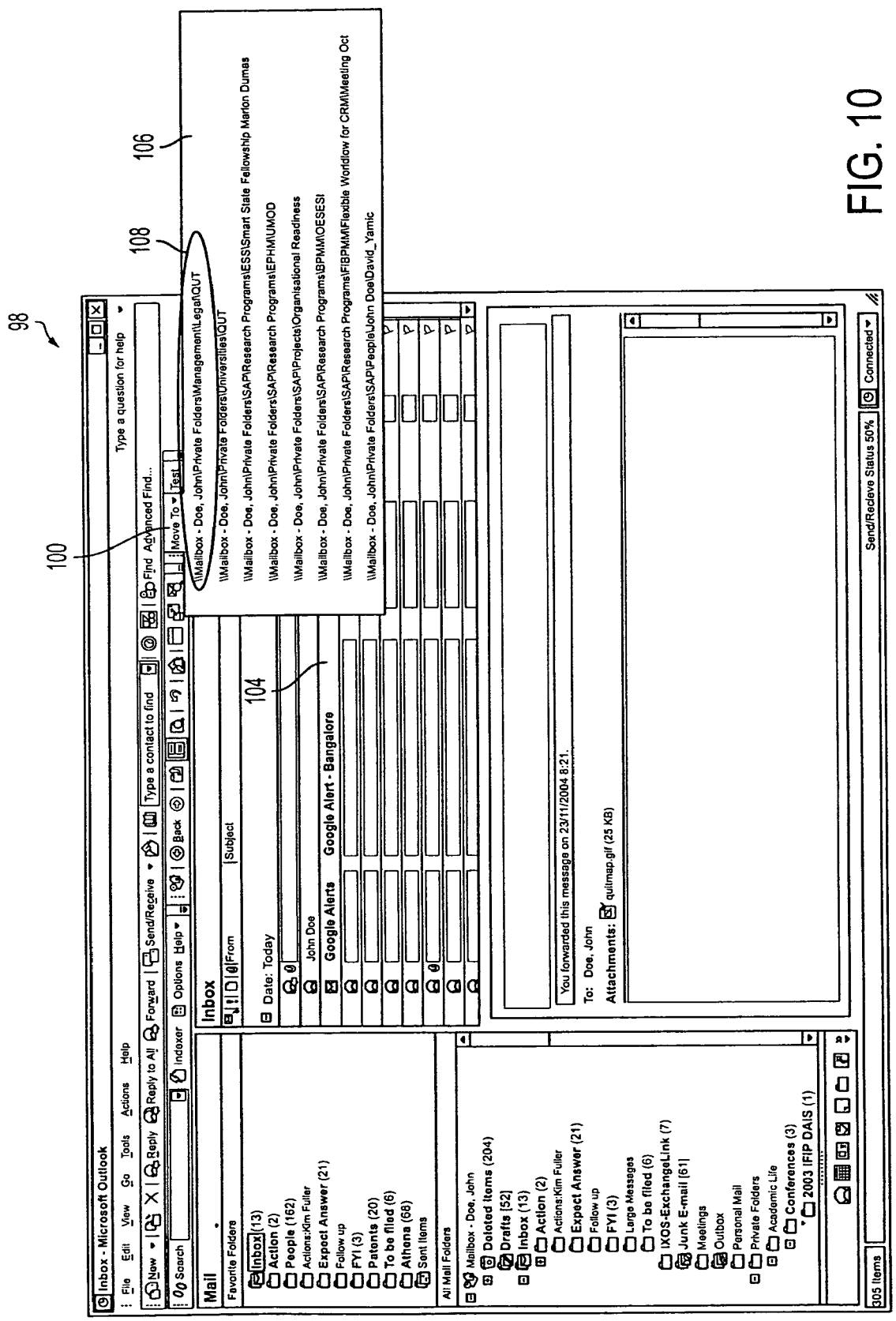
FIG. 10 is a screen shot, similar to FIGS. 8 and 9, illustrating the selection of the first entry of the short list of FIG. 9.

In FIG. 10, the first selection 108 on the drop down menu 106 is selected by the user. The user can, of course, select other suggestions from the list. In one embodiment, the list of suggestions of the drop down menu 106 are in hierarchical order with the best guess provided at the top and the worst provided at the bottom.

Figure 11:
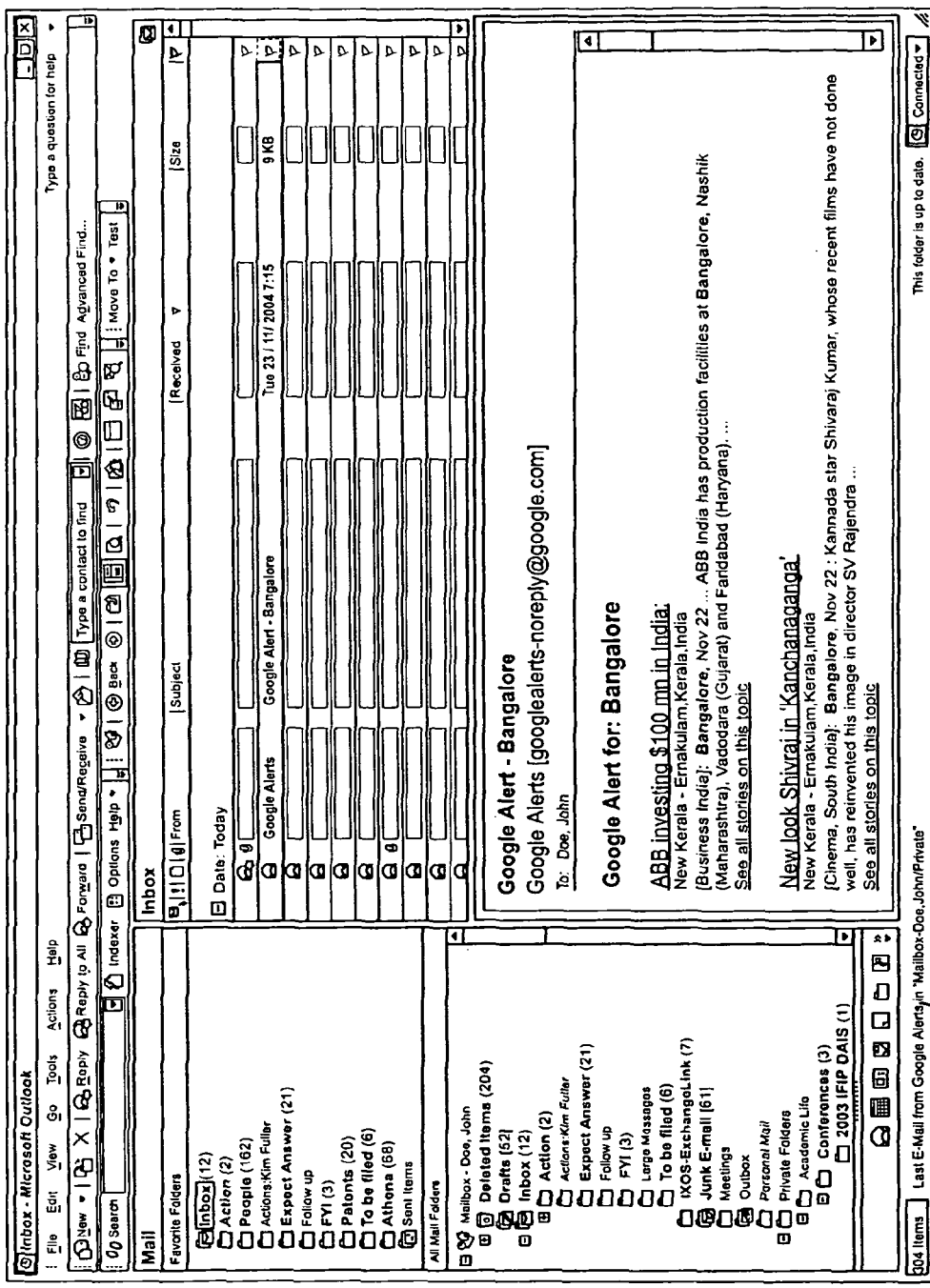
FIG. 11 is a screen shot, similar to that of FIGS. 8-10, after the filing of the e-mail in accordance with the suggested selection from the short list.

In FIG. 11, the screen shot 98 indicates a form of feedback that can be provided by the EFA plug-in software. In this instance, the notification bar 108 is provided with a message 110 to indicate where the last e-mail was filed. Other notification techniques can also be used, as will be appreciated by those skilled in the art.

An exemplary advantage, presented by way of example and not limitation, in some of these disclosed embodiments is that they can be used to train new assistants. For example, assume that a user has been filing his own e-mails, and then has hired a new assistant to perform this function for him. Initially, the user and the assistant would likely file the e-mails according to different principles. This would make it difficult, for example, for the user to find an e-mail that had been filed by his inexperienced assistant. By utilizing the functionality of the EFA, the assistant can learn the preferences of the user by accepting the most likely file saver (e.g., the first or top file folder) from the short list 106. In this fashion, the assistant can quickly learn the filing preferences of the user.

Figure 12:
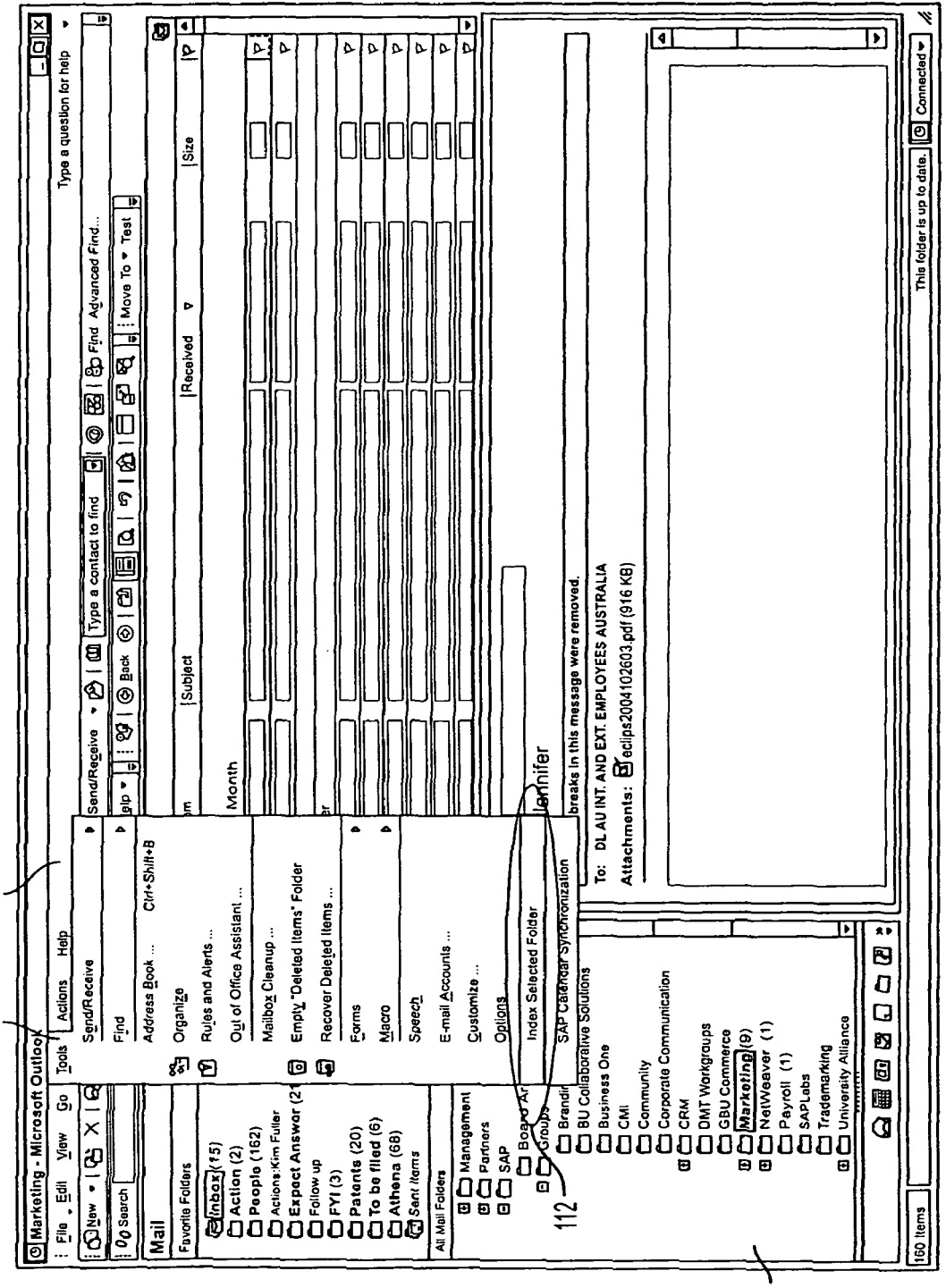
FIG. 12 is a screen shot, similar to the screen shots of FIGS. 8-11, indicating the selection of indexing the selected folder.

In FIG. 12, an exemplary embodiment on how the EFA can initially learn is illustrated. Upon request, often directly after installation of the EFA plug-in, the EFA software can scan a user's chosen e-mail folders to generate an index. This index may, in one exemplary embodiment, be kept in a database on the user's PC or laptop. The index, according to one embodiment, does not contain any contents of e-mails. Indexes in other embodiments may include content and/or other data concerning e-mails.

FIG. 12, an embodiment, presented by way of example and not limitation, of the EFA plug-in provides a functionality 112 of "Index Selected Folder" under the "Tools" button 114 of Action Bar 116. By selecting the selection 112 under the Tools button 114, the EFA software generates an index of the folder that the user has highlighted from a mail folder's section 118. While, in this example of FIG. 12, only the "Marketing" folder has been selected, it should be noted that all subfolders of the Marketing folder will also be indexed in one embodiment. In other embodiments only the selected folder will be indexed. Furthermore, in other embodiments, multiple folders can be designated for indexing.

Figure 13:
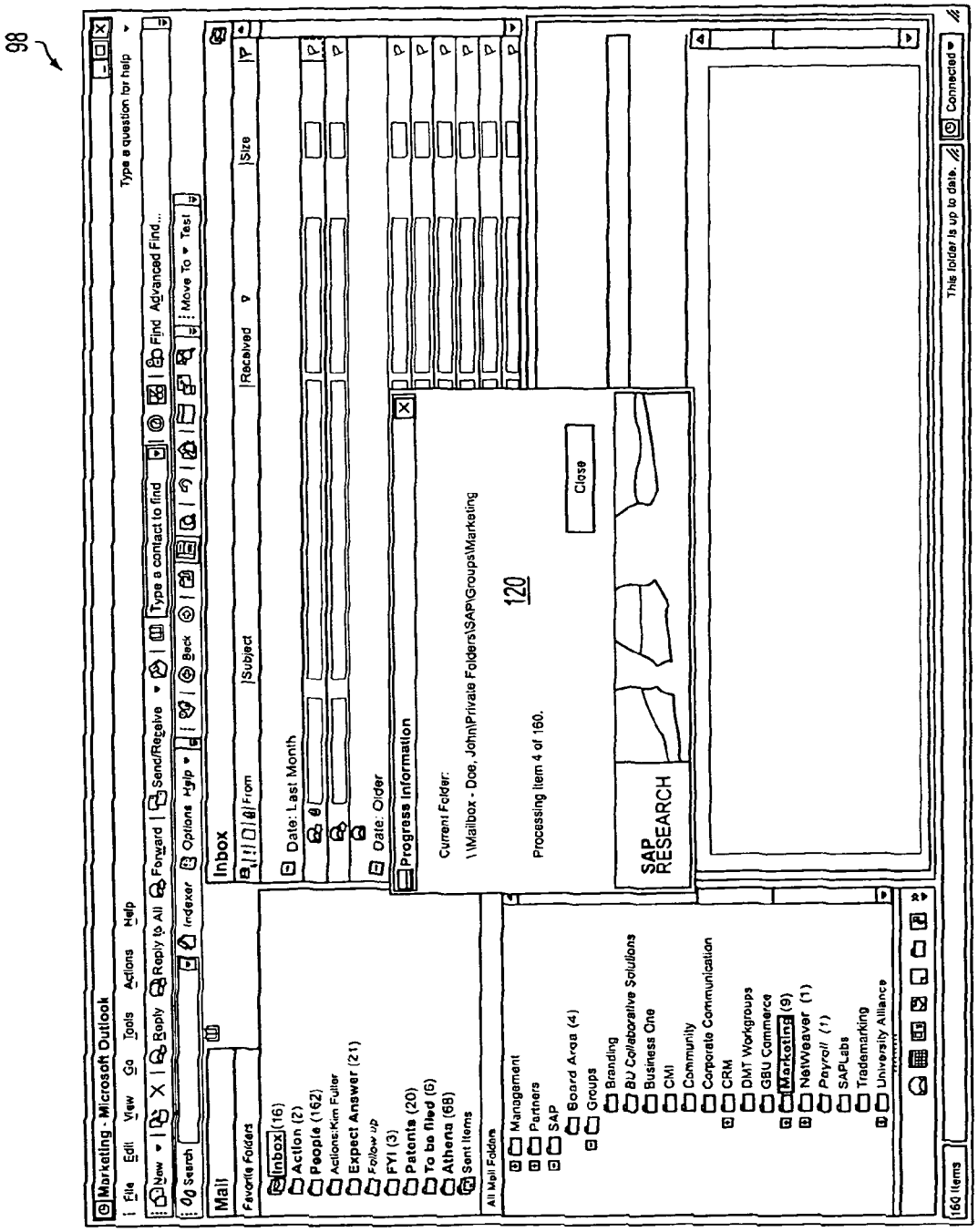
FIG. 13 is a screen shot, similar to the screen shots of FIGS. 8-12, indicating the progress of the processing of the folder selected in FIG. 12.

In FIG. 13, the screen shot 98 shows the index selected folder process in action. By way of example and not limitation, the process implemented by the EFA for indexing selected folders can include a dialog window 120 which shows the progress of the indexing task. In this instance, the dialog window 120 indicates that the current folder being processed is \\Mailbox-Doe, John\private folders\SAP\Groups\Marketing is being processed. Furthermore, the dialog window 120 indicates that it is processing item 4 out of 160.

Figure 14:
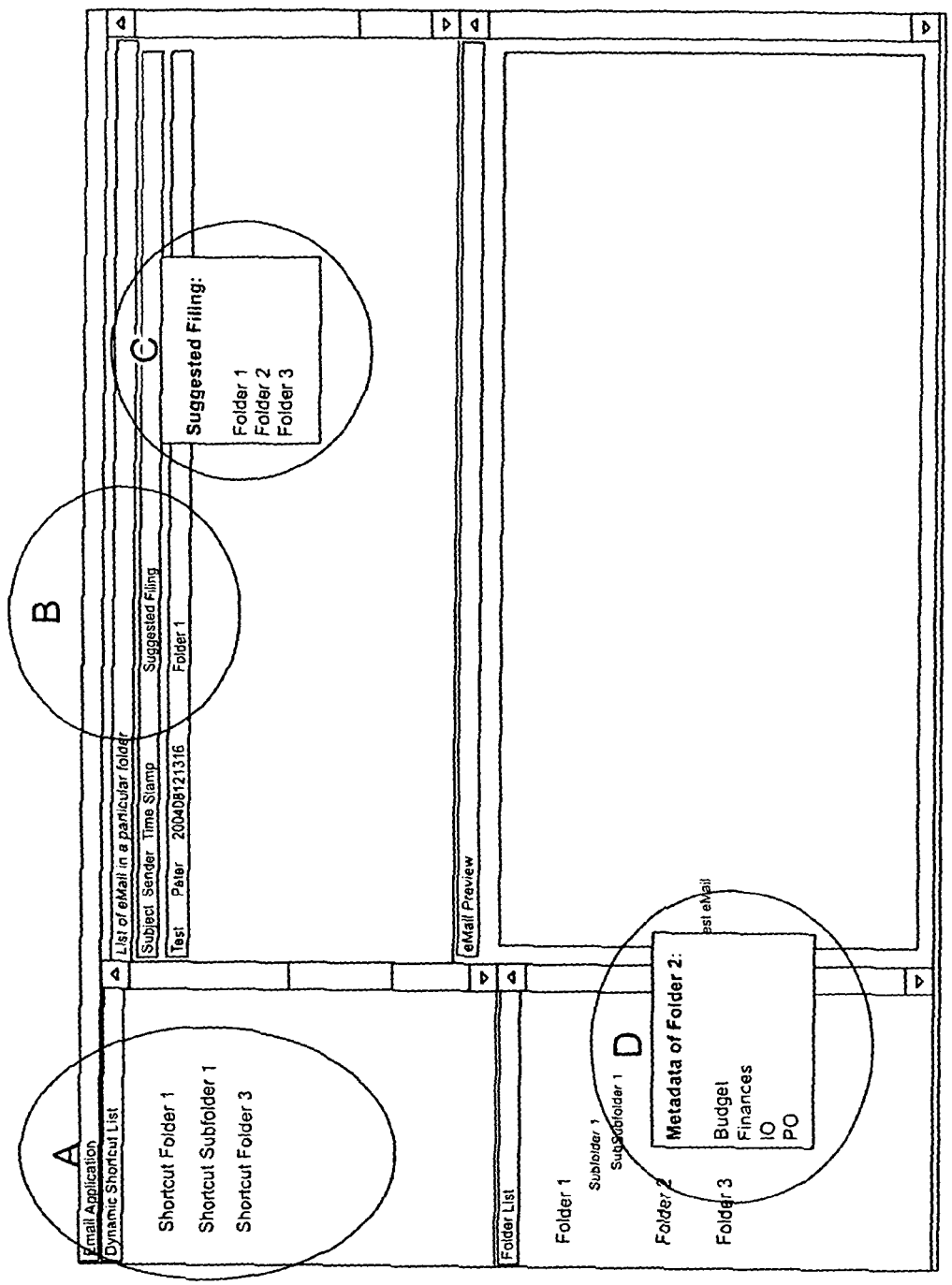
FIG. 14 is a screen shot illustrating several functional areas of an improved e-mail system by way of an example.

As discussed above, in accordance with certain exemplary embodiments, the filing of e-mails can be facilitated by introducing a number of supporting mechanisms. FIG. 14 includes a basic "look & feel" of certain exemplary embodiments.

A dynamic shortcut list A, by way of non-limiting example, displays the top-used filing folders. This list is dynamic in a sense that it can be continuously updated according to the user's actual e-mail filing history, in certain embodiments. This may be based on an approach which combines averages over short and long periods of time. For example: Filing ten e-mails into the "kick-off" folder within one day would trigger the dynamic shortcut list to reference this folder. Not filing any e-mail into this folder for one week would trigger the dynamic shortcut list to de-reference this folder.

It should be noted that in certain embodiments, there is a need to balance short-term and long-term usage of folders. There might be a folder, e.g. "Staff", that is continuously being used, and which should not be removed for such short-term folder highlights, as kick-off. Certain embodiment permit the user to configure the behaviour of the dynamic shortcut list.

It has been observed that e-mails from a particular sender are usually only filed to a relatively small set of target folders. By observing this filing behaviour of the user, the system can forecast a shortlist of target folders to the user. This shortlist can be presented to the user, e.g. by right-clicking on an e-mail, or any other appropriate and user-friendly method, so that the user preferably would not have to navigate through a folder hierarchy.

By way of non-limiting examples, ways of achieving this are referenced with "B" and "C" in FIG. 14. "B" is a single filing suggestion, which is displayed as part of the e-mail metadata. "C" is a context-sensitive menu which offers more filing choices.

In extension of the suggested filing through observation, the system in certain exemplary embodiments can analyze the metadata and the content of an e-mail and compute a fingerprint. On this basis, similar e-mails can be identified. Deducting the folder of a similar e-mail, the system could propose a target folder of a particular e-mail.

E-mail folders can, by way of non-limiting example, be annotated by an ontology or simply keywords. For e-mail that matches closely with a particular set of folder ontologies, the system could propose these folders as target folders. One possible way of entering and verifying a folder annotation is depicted in FIG. 14, and is referenced as "D". Note that this annotation can be conducted manually by the user or automatically by the e-mail programme, based on a keyword index of the e-mail that has already been filed into a particular folder.

Suggested Filing by Content Analysis is a more precise way of filing e-mails, however it is computationally more expensive as it requires the matching of "N" e-mails, where N is the total number of e-mails in a user's mailbox, whereas the filing through e-mail folder annotation only requires the matching of an e-mail with "M" folders, assuming that M<N, i.e. a user has less folders than e-mails, which is a realistic assumption.

In certain exemplary embodiments, a dynamic shortcut list decides whether an e-mail folder should be referenced or not. This decision is a function which takes into account the number of e-mails that have been filed into a folder within a given time interval.

Figure 15:
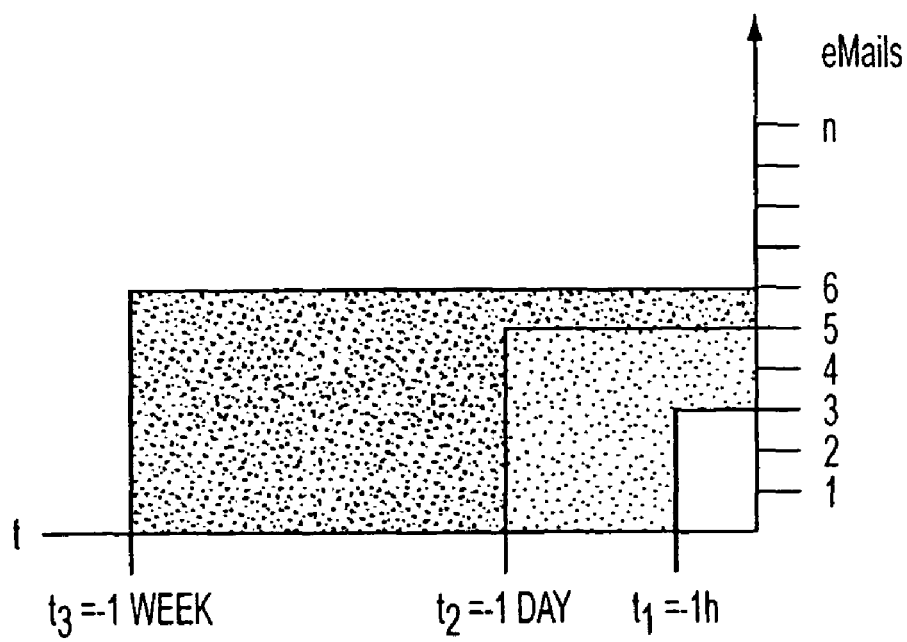
FIG. 15 is an area graph correlating time periods t with the number of e-mails in a system.

FIG. 15 depicts an exemplary cumulative distribution of e-mail at particular points in time. In this example, there have been three e-mails filed into a particular folder within the last 1 hour. Within the last 1 day, there have been five e-mails filed. This includes the three aforementioned e-mails. Within the last week, six e-mails had been filed. This means that one e-mail has been filed to the folder between 1 week ago and 1 day ago.

Figure 16:
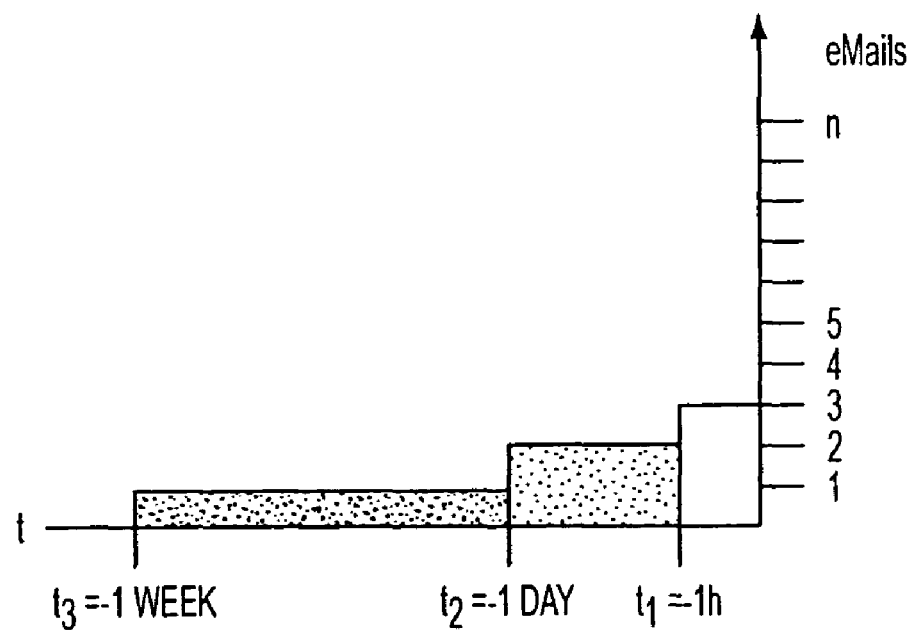
FIG. 16 is a bar graph correlating the time t with the number of e-mails.

The non-cumulative distribution of this example is depicted in FIG. 16. There, one e-mail has been filed in the interval between 1 week and 1 day ago, two e-mails have been filed between 1 hour ago and 1 day ago, and, three e-mails have been filed between now and 1 hour ago.

In order to determine if a folder should be part of the dynamic shortcut list, knowing the absolute number of e-mails in the folder, in certain embodiments, may not be sufficient. In certain embodiments, it is preferable to express the number of e-mails in a folder against different time intervals. The use of different time intervals facilitates the development of a folder-filing-profile, in certain embodiments.

By way of non-limiting example, a folder filing profile (FFP) is defined as an indicator for the usage of an e-mail folder in terms of e-mails that have been filed into it within a certain time intervals. The time intervals can be chosen arbitrarily, possibly by the user but most certainly as default value by the e-mail client application. FFP and its related normalised (NFFP) and non-normalised (NNFFP) forms are vectors, in which there may be, for example, at least three time intervals, which range from short-term via mid-term to long-term time intervals. For example, the duration of 1 hour as short-term, 1 day as mid-term, and 1 week as long-term time intervals can be used.

In FIG. 15, the non-normalized FFP is: (3 e-mails/1 h; 5 e-mails/1 day; 6 e-mail/week). This can also be expressed as NNFFP. The NNFFP, for example, can be used to compare the filing profiles of two folders with each other and therefore determine which of the two folders should be included in the dynamic shortcut list. As there are multiple values in each NNFFP of each folder to be compared, the user's filing strategy (see further below) determines which of the values is considered as most important for the comparison.

Further, in certain embodiments, it may be convenient to normalize the filing profile as to compare the e-mail filings per time interval with each other. For this example, assume that a working day consists of nd hours. The constant nd can be initially set to 8 which compares to an average working day. However part-time work would only compare to about 4 hours, while overtime work would result in 10, 12, or more hours per day. Observing mouse and keyboard entries of a computer gives a good indication of the actual usage behavior of a computer by a human. It needs to be complemented by the time that an e-mail application is active in case it uses macros to file e-mails automatically based on pre-defined rules.

Similarly, a working week can be defined, by way of example, as nw hours, in which nw=nd*x. Again, x could be any number between 1 and 7, depending on the work profile of a user. A typical full-time staff would work 5 days/week. A part-time staff might be working 2.5 days/week.

On this basis be can compute the normalized FFP, acronym NFFP. In FIG. 15 the NFFP is: (3 e-mails/1 h; 5 e-mails/nd h; 6 e-mails/nw h) with nd=8 and nw=40, this results into: (3 e-mails/h; 5/8 e-mails/h; 3/20 e-mails/h) or, short: (3; 0.625, 0.15).

By way of further example, assume that the folder "people" in the author's mailbox contains 7467 e-mails, which have been filed within the last 3.25 years, which are approximately 1524 days. Ignoring public holidays and leave, this results in 1524*5/7=1089 working days. 7467 e-mails/1089 days=6.9 e-mails/day. Assuming 8 working hours/day this results in 0.86 e-mails/hour. This is the average filing of e-mails over the lifetime of this folder. Forty-four e-mails were filed to this folder within the past week, resulting in an average of 44 e-mails/40 h=1.1. Eleven e-mails were filed to this folder within the past day, resulting in an average of 11 e-mails/8 h=1.375. Three e-mails were filed within the past hour, resulting in an average of 3 e-mails per hour.

The NFFP of this folder in this example is therefore (3; 1.375; 1.1; 0.86), including the overall life-time filing average. In this example, the folder has been used above-average within the past 1 h, 1 day, and past week.

Assuming that no further e-mail would be filed to this folder, it's NFFP would look like this in t+1 h: NFFP(+1 h)=(0, x,y0,z0). With no e-mail being filed to this folder within one day, it's NFFP would be: NFFP(+1 d)=(0,0,y1,z1).

Figure 17:
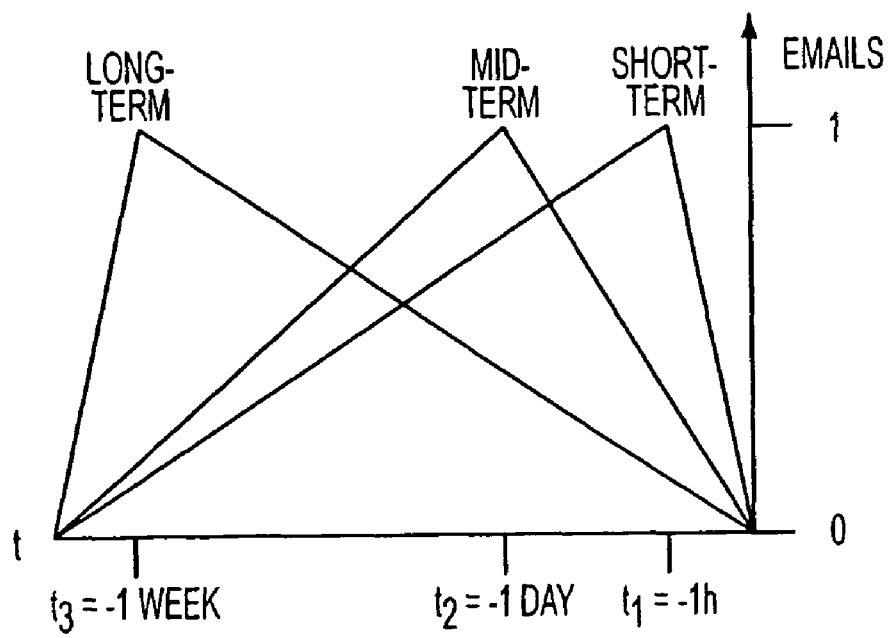
FIG. 17 is a graph illustrating the time versus the number of e-mails against long-term, mid-term and short-term criteria.

Based on the user's filing strategy, a weighting of the NFFP may be advantageous in certain non-limiting embodiments. This is achieved by appropriate weighting functions, which are graphed in FIG. 17. In a short-term filing strategy, the short-term values of the NFFP are kept, whilst all longer-term values are multiplied with a value less than one. Correspondingly a mid-term objective would demote all short- and long-term NFFP values and a long-term strategy would demote all short- and mid-term NFFP values, in this example.

Figure 18:
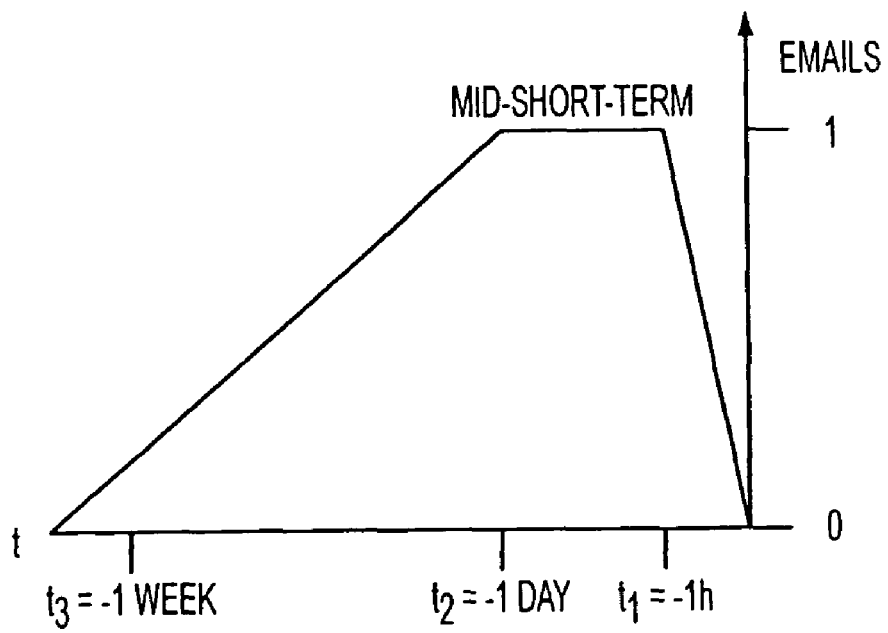
FIG. 18 is a graph illustrating time versus the number of e-mails in the mid-short-term.

In certain embodiments, different strategies can be combined. For example, if a user likes to emphasize short- and mid-term availability of folders in the dynamic shortcut list, he could invoke a filing strategy that is graphed in FIG. 18.

The filing strategy, in this example, could be a system-set value (default), set by the user, or be determined based on the user's work pattern. A user cleaning up his inbox (several 100 e-mails) might, for example, want to follow a combined long/mid-term strategy. This is because the e-mail in the inbox is a statistically relevant subset of all the e-mails that the user has ever filed. However, a user filing-off some 10s of e-mails in the morning might, for example, want to follow a mid/short-term filing strategy. A user working on a specific project for 2 hours in the afternoon might want to follow a short-term filing strategy only (and using a time interval of less than 1 h for short-term). The e-mail application in certain embodiments can be used to "sense" the user's intention and automatically switch between filing strategies, possibly after obtaining the user's consent first, as will be appreciated by those of skill in the art.

This approach can be further extended by introducing the concept of hysteresis. For example, it may be easier for a folder to be included in the dynamic shortcut list, but comparatively more difficult to be removed from it again. In hysteresis, a value may be set to exceed a threshold ta for a switch to take effect, whilst the value has to fall below a threshold tb (with tb<ta) to switch back. The value ta can be determined as the lowest NFFP of any folder in the dynamic shortcut list plus an offset oa, whilst tb is the lowest NFFP of any folder in the dynamic shortcut list minus an offset ob.

This concept is widely used in electrical Engineering (Schmitt-Trigger) or physics (ferromagnetism). The introduction of hysteresis to the dynamic shortcut list introduces a further element of stability against fluctuation of folders to/from the dynamic shortcut list in certain exemplary an non-limiting embodiments.

By way of example, assume that folders Fa, Fb, Fc, Fd are listed in a dynamic shortcut list that permits four folders to be listed at any given time. Their NFFPs for short-term filing strategy are: NFFPs(Fa)=5; NFFPs(Fb)=3; NFFPs(Fc)=2; NFFPs(Fd)=1. oa=ob=0.2. Therefore, ta=1.2; tb=0.8. A folder Fe would need, by way of example, to have an NFFPs (Fe)=1.2 to enter the dynamic shortcut list, whilst NFFPs(Fd) would need to fall below 0.8 to be removed from the list.

In another embodiment, suggested Filing (SF) is a method in which the system (such as the e-mail client) keeps track of the user's filing of e-mails. It is based on the assumption that e-mails with identical or similar metadata, such as the "from" field are usually filed to a relatively small set of target folders. With the two most prominent filing strategies: "by sender" and "by-topic", the analysis of the corresponding meta-data in conjunction with the filing history can be used to produce a list of potential target folders. This list, for example, could be a ranked list containing the most likely folders in a order of relevance (see, for example, FIG. 14, selection C). The list could contain only one entry and be presented as an additional e-mail metadata attribute (see, for example, FIG. 14, selection B).

Past Filing History can, by way of non-limiting example, be stored in a table according to the schema of Table 1, below:

TABLE 1

Table Schema for Suggested Filing (Observed)

| Metadata-attribute 1 | Metadata-attribute 2 | Metadata-attribute n | Target Folder | Number of filings |
|---|---|---|---|---|

In its simplest form, the table would only contain one metadata attribute, such as the "from" field of an e-mail. Other embodiments may include other attributes.

In the below example of Table 2, e-mail from Peter Miller has most frequently been filed in the /people folder, followed by the /projects/ASDF folder:

TABLE 2

From-based Suggested Filing (Observed)

| From | Target Folder | Number of Filings |
|---|---|---|
| Peter.miller@sap.com | /people | 12 |
| Peter.miller@sap.com | /projects/ASDF | 5 |

Also, the subject line is a rich source of information that can be used for the filing of e-mail. See, for example, Table 3:

TABLE 3

Subject-based Suggested Filing (Observed)

| Subject | Target Folder | Number of Filings |
|---|---|---|
| Budget | /finance/budgeting | 12 |
| kick-off | /meetings/KOM | 1 |
| KOM | /meetings/KOM | 8 |
| DKOM | /meetings/KOM | 4 |

In this example, subject lines of e-mails containing the terms kick-off, KOM (Kick-Off Meeting), and DKOM (Developer Kick-Off Meeting) all result in filings to the folder /meetings/KOM. For subject-based suggested filing, the e-mail system needs to break-down key terms of the subject line as entries in the filing table. This could be achieved with a statistical analysis of the subject line.

Table 4 illustrates an exemplary combination of metadata. There, e-mail from Peter Miller that contain the term "budget" in the subject line have been filed to the /finance/budgeting folder on 12 occasions. Also, e-mail from the same author on the same topic has also been filed to the /projects/ASDF folder on 3 occasions.

TABLE 4

Combined Metadata for Suggested Filing (Observed)

| From | Subject | Target Folder | Number of Filings |
|---|---|---|---|
| Peter.miller@sap.com | Budget | /finance/budgeting | 12 |
| Peter.miller@sap.com | Budget | /projects/ASDF | 3 |

The suggested filing of e-mails can be further refined, in an exemplary and non-limiting embodiment, by creating a characteristic fingerprint of an e-mail and comparing it with the fingerprints of e-mails that have already been filed. By deducting the folder in which the already filed e-mails reside, the system could propose target filing folders as per the mechanisms that have been discussed further above. The fingerprint can be generated using current indexing approaches, such as linguistically or statistically. The information about each e-mail is stored persistently by an appropriate means, such as a database in the form:

| E-mail id | Fingerprint |
|---|---|
| 1 | Fp1 |
| 2 | Fp2 |

The technology to create such a fingerprint is analogous to web indexing software, such as used by Altavista, Google, or Yahoo.

Once an e-mail is to be filed, the fingerprint of the e-mail is generated and compared to the fingerprints of e-mails in the user's folders. The result is a ranked list of folders into which the e-mail would fit. A subset of the ranked list is presented back to the user.

E-mail folder annotation can be, for example, considered to be an extension of the suggested filing by content analysis. An attempt to average over the fingerprints of an e-mail folder and to compare this averaged fingerprint with the fingerprint of an e-mail that is to be filed is an aspect of such an embodiment. The folder's finger print can be generated automatically on the basis of the existing e-mails that reside in the folder. In a technologically less-intensive approach, the user herself annotates her folders by entering metadata information, such as keywords. By way of non-limiting example, a folder "Budgeting" could be annotated with keywords, such as "budget", "finances", "forecast", "cost centre" "purchase order" "internal order."

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. An e-mail filing system comprising:
   an e-mail server including at least one client mailbox of a client user for receipt of e-mails over a network from e-mail senders;
   at least one client apparatus of said client user coupled to said e-mail server for access to said e-mails in said client mailbox;
   wherein at least one of said e-mail server and said at least one client apparatus facilitates filing said e-mails by providing a plurality of suggestions to said client user as to where to file said e-mails, and wherein said plurality of suggestions include a list of subject folders ranked by subject frequencies of past e-mails received from said e-mail senders within a selected timeframe.

2. An e-mail filing system as recited in claim 1 wherein said e-mail server and said at least one client apparatus are implemented on the same computer system.

3. An e-mail filing system as recited in claim 1 wherein said e-mail server and said at least one client apparatus are implemented on different computer systems.

4. An e-mail filing system as recited in claim 3 wherein said plurality of suggestions are ranked to provide ranked suggestions, and wherein said ranked suggestions are provided, at least in part, by observing past filing behavior of said client user.

5. An e-mail filing system as recited in claim 3 wherein said plurality of suggestions is provided, at least in part, by analyzing at least one of metadata or content of said e-mails.

6. An e-mail filing system as recited in claim 5 wherein said analyzing includes the analysis of e-mail addresses.

7. A method to facilitate e-mail filing comprising:
   monitoring filing of e-mail by an e-mail recipient;
   creating a dynamic shortcut list of filing locations based upon said monitoring;
   adding a first folder in the dynamic shortcut list of filing locations if a frequency of filing emails into the first folder meets a threshold;
   removing a second folder from the dynamic shortcut list of filing locations if a frequency of filing emails into the second folder falls below the threshold; and
   displaying said shortcut list of filing locations to facilitate the filing of future e-mail by the e-mail recipient,
   wherein said shortcut list of filing locations include a list of subject folders ranked by subject frequencies of past e-mails received by the e-mail recipient within a selected timeframe.

8. A method to facilitate e-mail filing as recited in claim 7 wherein said monitoring of the filing of e-mail comprises:
   noting the filing of a filed e-mail in a folder; and
   storing data concerning said filed e-mail and said folder.

9. A method to facilitate e-mail filing as recited in claim 8 wherein said data concerning said filed e-mail and said folder is filed in a database.

10. A method to facilitate e-mail filing as recited in claim 8 wherein said data concerning said filed e-mail and said folder includes an address of a sender of said filed e-mail and an identity of said folder.

11. A method to facilitate e-mail filing as recited in claim 10 wherein said data concerning said filed e-mail further includes a number of email messages filed in said folder.

12. A method to facilitate e-mail filing comprising:
   detecting a request for a recommendation as to where to file an e-mail by an e-mail recipient;
   analyzing said e-mail;
   comparing said e-mail to a database of e-mail filing information; and
   displaying a shortcut list of filing locations to facilitate filing of e-mail by the e-mail recipient,
   wherein said shortcut list of filing locations include a list of subject folders ranked by subject frequencies of past e-mails received by the e-mail recipient within a selected timeframe.

13. A method to facilitate e-mail filing as recited in claim 12 wherein said database is created, at least in part, by:
   noting the filing of a filed e-mail in a folder; and
   storing data concerning said filed e-mail and said folder in said database.

14. A method to facilitate e-mail filing as recited in claim 13 wherein said data concerning said filed e-mail and said folder includes an address of a sender of said filed e-mail and an identity of said folder.

15. A method to facilitate e-mail filing as recited in claim 14 wherein said data concerning said filed e-mail further includes a number of email messages filed in said folder.

* * * * *